(12) United States Patent
Goetz et al.

(10) Patent No.: US 7,354,315 B2
(45) Date of Patent: Apr. 8, 2008

(54) RELEASABLE PLUG CONNECTOR SYSTEM

(75) Inventors: David Robert Goetz, Los Angeles, CA (US); William Tan, Los Angeles, CA (US)

(73) Assignee: Replug, LLC, Los Angeles, CA (US)

( * ) Notice: Subject to any disclaimer, the term of this patent is extended or adjusted under 35 U.S.C. 154(b) by 0 days.

(21) Appl. No.: 11/627,932

(22) Filed: Jan. 26, 2007

(65) Prior Publication Data

US 2007/0178771 A1    Aug. 2, 2007

Related U.S. Application Data

(60) Provisional application No. 60/762,834, filed on Jan. 27, 2006.

(51) Int. Cl.
*H01R 24/04* (2006.01)

(52) U.S. Cl. ....................... 439/669; 439/638

(58) Field of Classification Search ........... 439/668, 439/669, 660, 502, 578, 638
See application file for complete search history.

(56) References Cited

U.S. PATENT DOCUMENTS

| | | | |
|---|---|---|---|
| 6,203,344 B1 * | 3/2001 | Ito | 439/218 |
| 6,533,617 B1 * | 3/2003 | D'Addario | 439/669 |
| 6,979,231 B2 * | 12/2005 | Shinohara | 439/669 |
| 6,988,905 B2 * | 1/2006 | Corey et al. | 439/222 |
| 7,056,127 B2 | 6/2006 | Suzuki et al. | |
| 7,192,314 B1 * | 3/2007 | Shiu | 439/669 |

OTHER PUBLICATIONS

Printout from Jodavi.net website of product entitled Snap-Jack Guitar Cable (dual side) (1 page).

* cited by examiner

*Primary Examiner*—Khiem Nguyen
(74) *Attorney, Agent, or Firm*—George G. C. Tseng; McDermott Will & Emery, LLP

(57) ABSTRACT

A connector system for coupling to an audio jack of an audio player. The system includes an audio plug having a first portion configured to fit into the audio jack, the plug including at least one conductor forming a conducting path with the jack; and, a second portion configured to remain on the outside of the jack of the audio player after the first portion is inserted into the jack, the second portion having at least one contact coupled to the at least one conductor. The jack also includes a protruding edge surrounding the at least one contact. The system further includes a coupler to the plug having a first end having at least one coupling contact disposed thereon to contact the at least one contact on the plug, and a cap surrounding the at least one coupling contact, the cap configured to releasably engage the protruding edge on the plug; and, a receptacle at a second end of the coupler for receiving a standard plug.

22 Claims, 17 Drawing Sheets

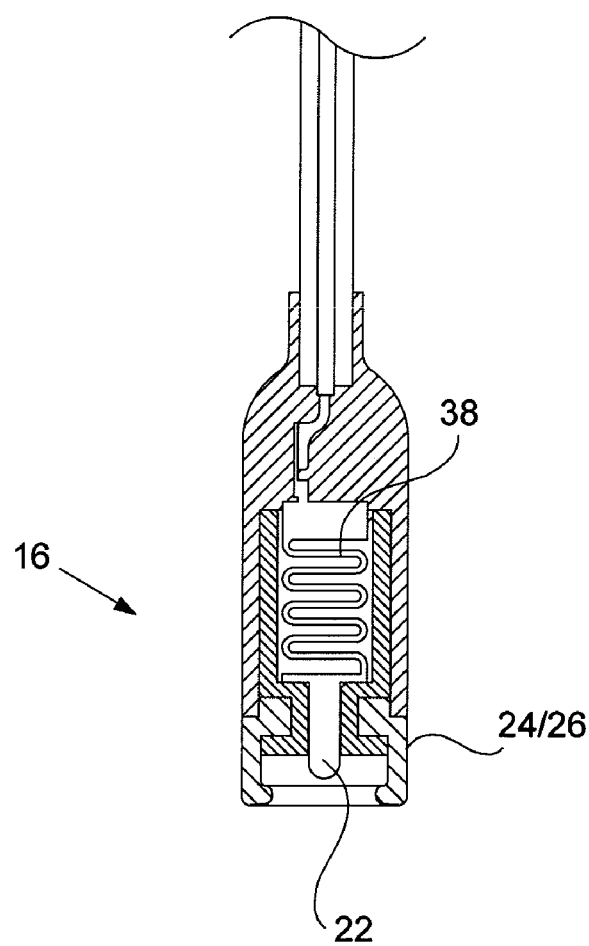
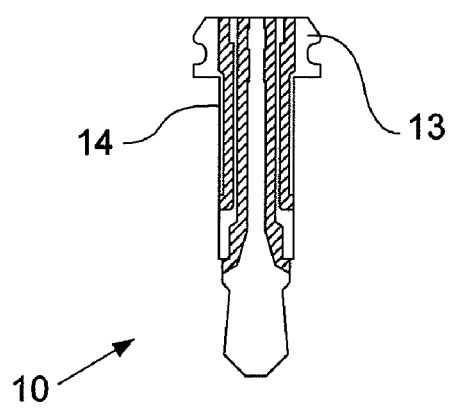
FIG. 8

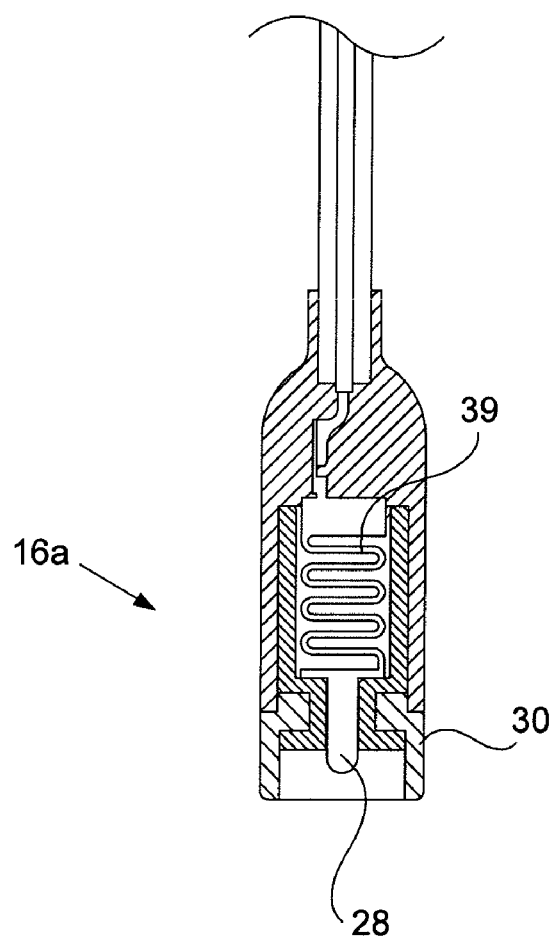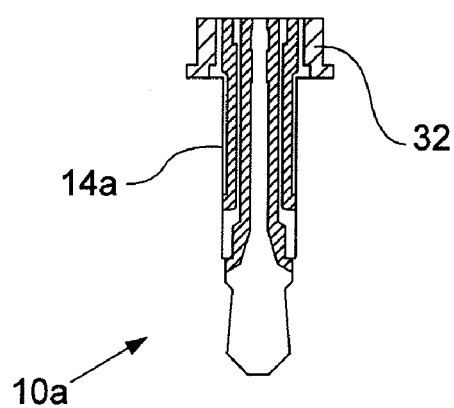
FIG. 9

RELEASABLE PLUG CONNECTOR SYSTEM

CLAIM OF PRIORITY UNDER 35 U.S.C. §119

The present application for patent claims priority to Provisional Application No. 60/762,834 entitled "RELEASABLE PLUG CONNECTOR FOR PORTABLE MEDIA PLAYERS SUCH AS IPOD AND MP3 PLAYERS" filed Jan. 27, 2006, and assigned to the assignee hereof and hereby expressly incorporated by reference herein.

BACKGROUND

1. Field

The present invention relates to audio, video, data, power and other interface connectors for electronic devices and, more particularly, the present invention is directed to releasable, or break-away, connectors for coupling between electronic devices and their various interface connectors.

2. Background

MP3 and other portable media players and electronic devices have become quite popular and ubiquitous in recent years. For example, many people carry the IPOD® by Apple Computer, Inc., in their pocket or backpack, where the IPOD is subjected to significant abuse as the users move about. One of the most fragile aspects of the IPOD and other media players is its audio jack and the internal connection circuitry of the player to which the audio jack is connected. The audio jack and the internal connection circuitry form a deep engagement within the player. Coupled with the protruding stem of the audio plug, which is normally covered by a plastic/rubber sleeve, a cantilever effect is unintentionally created when the audio plug and jack experiences a lateral, bending force, or when the cable of the headset is being tugged. However, when the audio plug and/or jack is excessively impacted or bent due to external forces, the abuse will damage the internal connection circuitry—eventually rendering the audio jack unusable.

Unfortunately, such abuses are not exclusive to music or media players; the hands-free plug and jack of mobile phones and laptop or desktop computers are equally vulnerable. The impact to mobile phone users from the loss of the use of the jack is generally not as devastating as the phones could still be used without the hands-free headset. However, for IPODs or other media players, such damage would require the jack to be repaired or replaced. Without a functional jack, a media player such as the IPOD would become unusable as a listening device.

Certain manufacturers of mobile phones have proposed the use of customized "break-away" interface connectors; avoiding the use of typical audio plugs and jacks for audio connection to headsets. Laptop manufacturers such as Apple Computer have also introduced "break-away" power connectors called "MagSafe" to address the issue of damage to laptops due to impact or bending from typical power plugs. However, these custom connectors are specific to the device to which they are connected and cannot be used on other electronic devices that do not have matching receptacles.

It is desirable to have a releasable coupling connector that provides existing electronic devices with a "break-away" feature. It is also desirable to provide the break-away feature without the need for any modifications to the existing configuration or circuitry of the electronic device.

SUMMARY OF THE PREFERRED EMBODIMENTS

The present invention provides a connector system that includes a plug that will easily break-off from the jack of an electronic device such as a media player when impacted by an external force, especially a lateral and bending one. The connector system provides an intermediary interface with a break-away connector that is compatible with the existing jack of the media player, as well as the existing plug of the player's headset. The connector system may also be integrated with the cable of a headset.

In one preferred embodiment, the present invention is implemented as a connector system for coupling to an audio jack of an audio player. The connector system includes an audio plug having: i) a first portion configured to fit into said audio jack of said audio player, said audio plug including at least one conductor forming a conducting path with said audio jack; and, ii) a second portion configured to remain on said outside of said audio jack of said audio player after said first portion is inserted into said audio jack, said second portion having at least one contact coupled to said at least one conductor; and, iii) a protruding edge surrounding said at least one contact. The connector system also includes a coupler to said audio plug having: i) a first end having at least one coupling contact disposed thereon to contact said at least one contact on said audio plug, and a cap surrounding said at least one coupling contact, said cap configured to releasably engage said protruding edge on said audio plug; and, ii) a receptacle at a second end of said coupler for receiving a standard audio plug.

In yet another preferred embodiment, the present invention is implemented as a releasable connector system for a media player, said media player having an existing jack for outputting multimedia signals. The releasable connector system includes a plug, said plug being configured to fit into said existing jack and provide at least one conducting path from said media player. The releasable connector system also includes a receptacle coupled to said releasable coupler, said receptacle being disposed to receive a standard plug to provide a second conducting path from said standard plug. The releasable connector system further includes a releasable coupler having a first portion engaged to said plug and a second portion coupled to said receptacle, wherein said releasable coupler is configured to separate into said first portion and said second portion upon experiencing a predetermined external force from one of said plug and said receptacle In still yet another preferred embodiment, the present invention is implemented as a headset for an audio player, said audio player having an audio jack. The headset includes an audio plug having: i) an inside portion configured to fit into said audio jack of said audio player and providing a conducting path to said audio jack; and, ii) an outside portion configured to remain on the outside of said player after said inside portion is inserted into said audio jack of said audio player, said outside portion comprising a planar contact coupled to said conducting path. The headset also includes a break-away coupler having: i) at least one contact disposed at a first end of said break-away coupler, to contact said planar contact to extend said conducting path; ii) a cap surrounding said at least one contact, disposed to releasably engage said audio plug; and, iii) a headset disposed at a second end of said break-away coupler, wherein said at least one contact disposed at said first end of said break-away coupler extending said conducting path to said headset.

Other objects, features and advantages will become apparent to those skilled in the art from the following detailed description. It is to be understood, however, that the detailed description and specific examples, while indicating exemplary embodiments, are given by way of illustration and not limitation. Many changes and modifications within the scope of the following description may be made without departing from the spirit thereof, and the description should be understood to include all such variations.

BRIEF DESCRIPTION OF THE DRAWINGS

The invention may be more readily understood by referring to the accompanying drawings in which:

FIG. 8 is a cross-sectional view of the embodiment of the connector system of FIG. 1 having the resilient coupler of FIG. 4;

FIG. 9 is a cross-sectional view of the embodiment of the connector system of FIG. 1 having the magnetic coupler of FIG. 7;

Like numerals refer to like parts throughout the several views of the drawings.

DETAILED DESCRIPTION OF THE PREFERRED EMBODIMENTS

The releasable, or "break-away" connector system as configured in accordance with the present invention is directed to electronic devices such as MP3 players, laptop or desktop computers, gaming consoles or other media players, where an audio jack is used for connecting the media player to the headset's plug. The releasable connector system could be either an add-on coupling connector between a conventional audio jack and a conventional headset, or an integrated segment for the audio plug of the headset. One of the main advantages is to allow the coupling connector to detach from the audio jack when the coupling connector experiences a lateral force or impact so as to protect the internal connection circuitry of the media player.

In the description that follows, instead of specifying "audio," "video," "data," or "power," reference will be made to "audio" for simplicity. However, it should be apparent to those of ordinary skill in the art that all interface connectors that are susceptible to accidental impact or other damaging forces such as "audio," "video," "power" or "data" connectors can readily take advantage of the present invention.

Figure 1:
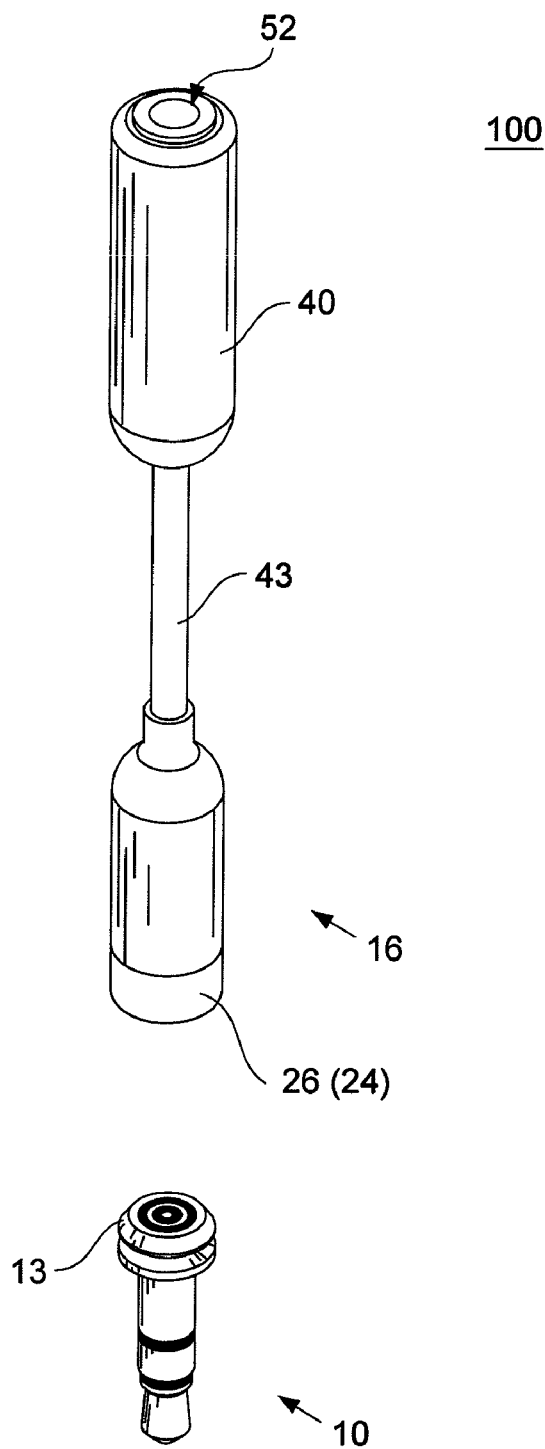
FIG. 1 is a perspective view of a connector system configured in accordance with one preferred embodiment of the present invention.

FIG. 1 illustrates a connector system 100, configured in accordance with one preferred embodiment of the present invention that comprises three portions: audio plug 10, a coupler 16, and a receptacle 40. A flexible extension 43 may also be provided between the coupler 16 and the receptacle 40, although the length is preferably kept nominal. In one preferred embodiment of the present invention, receptacle 40 includes an opening 52 configured to accept a plug from a conventional headset.

Figure 2:
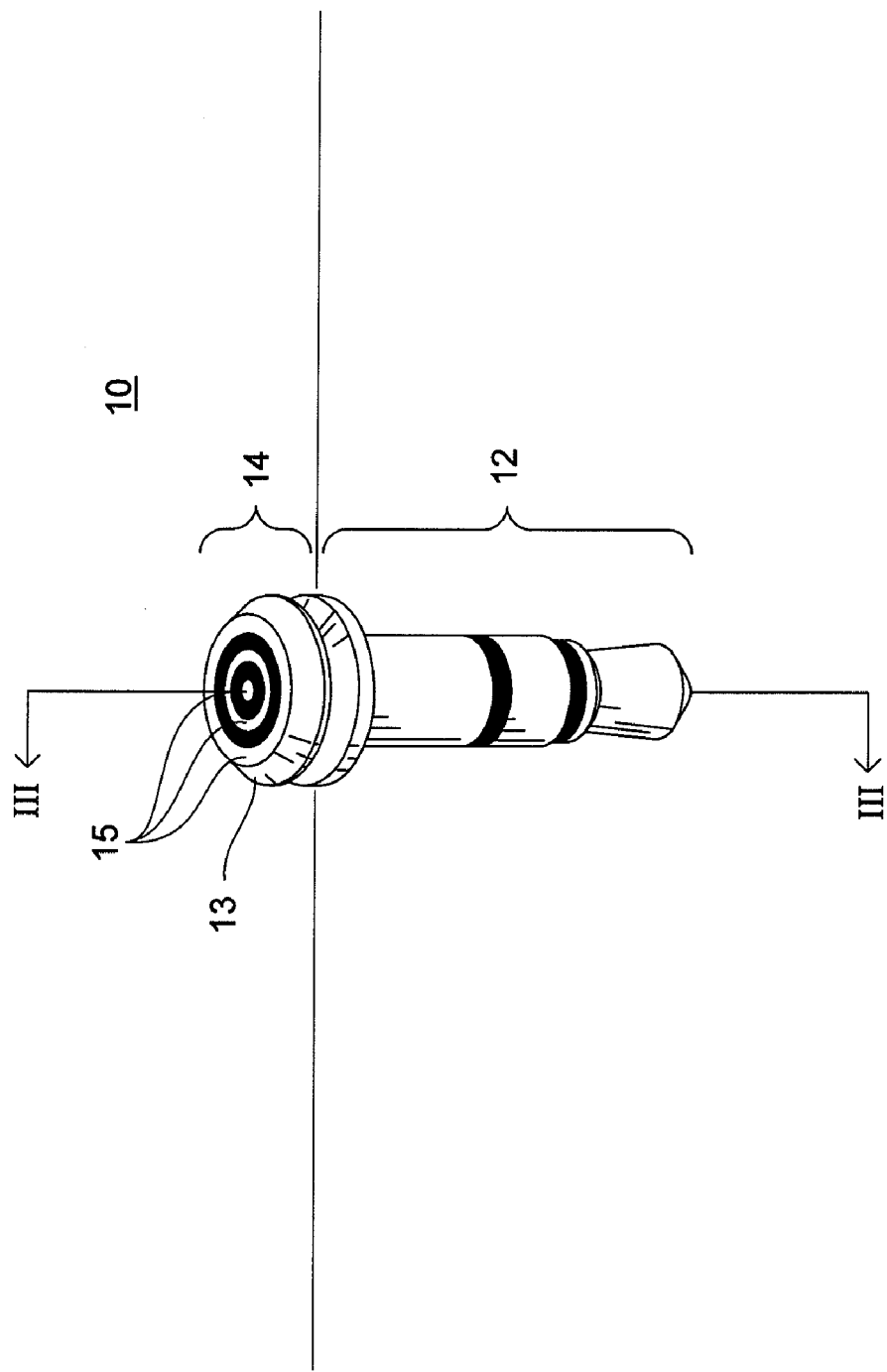
FIG. 2 is a perspective view of a plug portion of the connector system of FIG. 1 configured in accordance with one preferred embodiment of the present invention.
Figure 4:
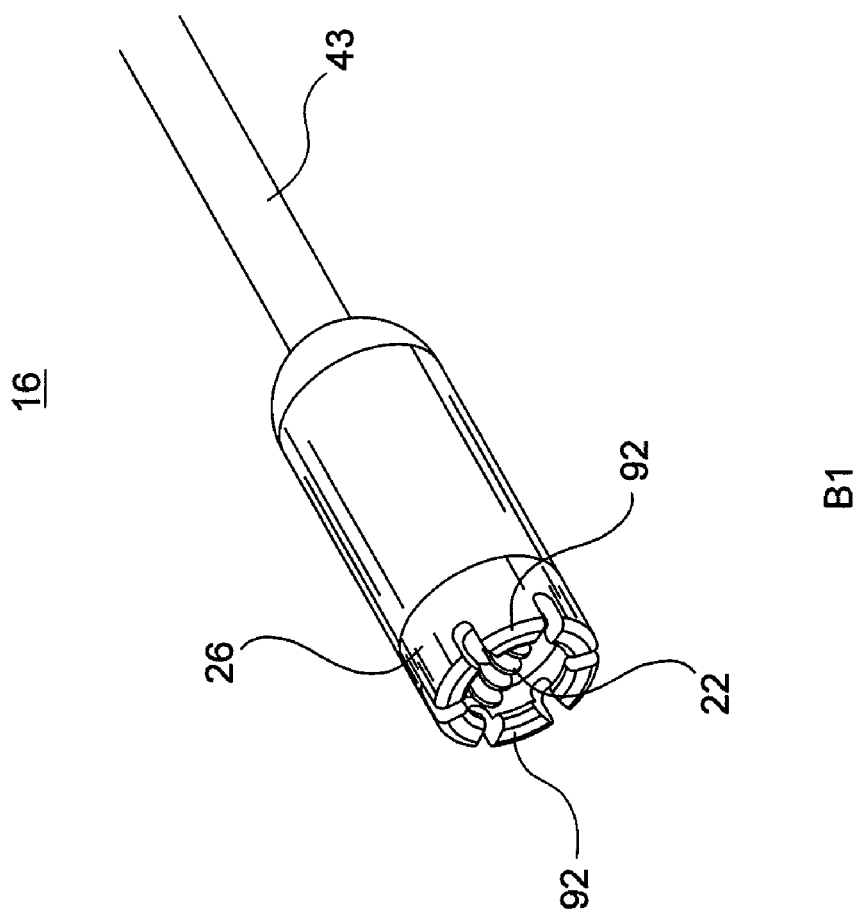
FIG. 4 is a perspective view of a notched resilient coupler portion of the connector system of FIG. 1 configured in accordance with one preferred embodiment of the present invention.

Reference is made to FIG. 2, where the audio plug 10 is shown. The audio plug 10 includes two sections: section 12 and section 14. Section 12 represents the portion of the audio plug 10 that is to be inserted into an existing audio jack of a media player, as further described herein. Section 14 represents the portion of the audio plug 10 that remains on the outside of the existing audio jack of the media player after section 12 is inserted. Section 14 preferably has a plurality of electric contacts 15, as illustrated in FIG. 4, for connection with a plurality of spring-loaded contacts 22 displaced on the coupler 16. The plurality of electric contacts 15 is comprised of several individual contacts that carry the signal from section 12 of the audio plug 10 to the portion of section 14 for interfacing with the plurality of spring-loaded contacts 22 of the coupler 16. In one preferred embodiment of the present invention, the plurality of electric contacts 15 are planar and arranged in concentric circles. Section 12 is dimensioned so that it may receive a conventional jack from any audio or video player device. Section 14 preferably has a wider diameter than section 12. The plurality of electric contacts 15 on the top of the audio plug 10 is surrounded by a protruding edge 13, which facilitates a releasable engagement with the cap 26 of the coupler 16.

Figure 3:
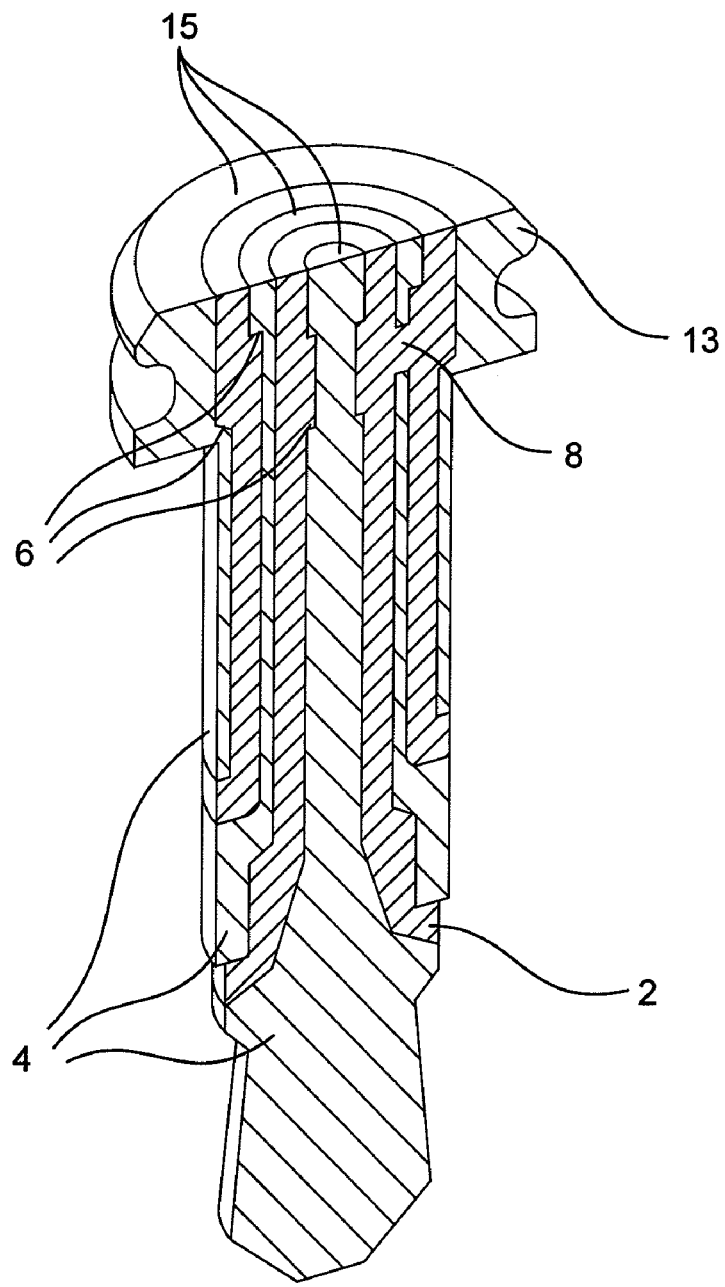
FIG. 3 is a cross-sectional view of the plug portion of FIG. 2 configured in accordance with one preferred embodiment of the present invention; 8

FIG. 3 illustrates a cross sectional view of the audio plug 10 of the connector system 100, taken along line III-III of FIG. 2. The cross section of the audio plug 10 illustrates a plurality barrels 4 that make up the plurality of electric contacts 15. The various barrels of the plurality of barrels 4 need to be secured to one another. Otherwise, they will separate and/or fall apart. In order to achieve a planar surface of the plurality of electric contacts 15 on the audio plug 10, in one preferred embodiment of the present invention each barrel in the plurality of barrels 4 is attached to each other by creating an uneven portion 6 on each of the barrels in the plurality of barrels 4. The uneven portions allow the plurality of barrels 4 to trap each other when a material such as resin, which also operates as insulation, is displaced between each barrel. In one preferred embodiment of the present invention, an opening 8 is made in the middle barrel (or made in multiple middle barrels if there are 4 or more barrels) to allow the insulating resin to travel from between one barrel to another, and assists in trapping any middle barrels in the assembly of the audio plug 10. This approach is an economical approach of producing an audio plug with the smallest possible form factor, because there are no secondary parts to assemble in creating the plurality of electric contacts 15 as the end of each barrel itself is the contact surface for the spring contacts. In one preferred embodiment of the present invention, the diameter of the contact surface of the middle pin (i.e., solid barrel) has to be smaller than the inner diameter of the next barrel. The outer diameter of the contact surface of this barrel also has to be smaller than the inner diameter of the next barrel, and so on and so forth.

Figure 5:
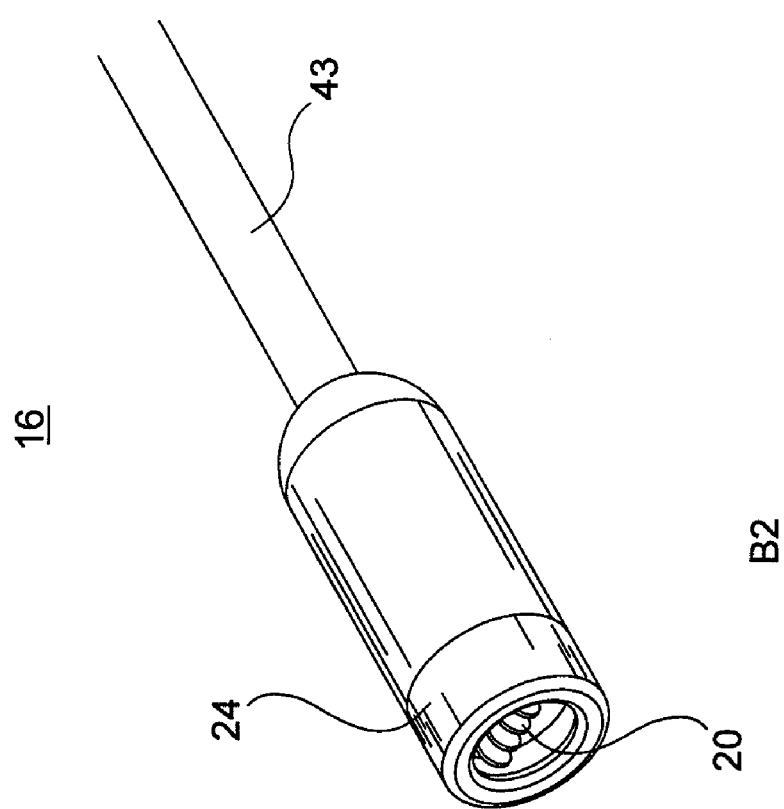
FIG. 5 is a perspective view of a non-notched resilient coupler portion of the connector system of FIG. 1 configured in accordance with one preferred embodiment of the present invention.

Referring to FIGS. 4 and 5, the coupler 16 includes two exemplary embodiments, B1 and B2. In the B1 embodiment, one end of the cable 16 includes the plurality of spring-loaded electric contacts for forming a conducting path with the plurality of electrical contacts 15 on section 14 of the audio plug 10. In one preferred embodiment of the present invention, the plurality of spring-loaded electrical contacts 22 is implemented with tabs. In other preferred embodiments, the plurality of spring-loaded electrical contacts 22 is implemented with pins, wires, or other suitable contacts for coupling with the plurality of electrical contacts 15. An open-ended cap 26 surrounds the plurality of spring-loaded contacts 22 and is dimensioned in such a way that it firmly, but releasably, engages the protruding edge 13 of section 14 to form the conducting path. The cap 26 of B1 is preferably made of a resilient material, e.g., polyethylene, such that it allows section 14 to be easily engaged by being snapped into section 12 and to easily break away when confronted by an external force greater than its predetermined tolerance. The plurality of spring-loaded contacts 22 further ensures solid contact with the plurality of electrical contacts 15 on section 14. In other embodiments of the present invention, instead of being bruised by springs, the plurability.

As shown in FIG. 4, the perimeter of the cap 26 includes a plurality of notches 92 formed around it, thus making it easier for section 14 of the audio plug 10 to be snapped into and broken away (i.e., disengaged) from the cap 26. In another preferred embodiment of the present invention, as shown in FIG. 5, the perimeter of a cap 24 in embodiment B2 is continuous without any notches formed therein. As can be appreciated by those of ordinary skill in the art, both designs provide the same engagement/disengagement functionality and the resiliency of the caps can be determined and adjusted based on the material used for the caps, as well as the number or shape of notches formed thereon. Further, in another preferred embodiment of the present invention, a friction coupling between section 12 and 14 may also be used.

Figure 10:
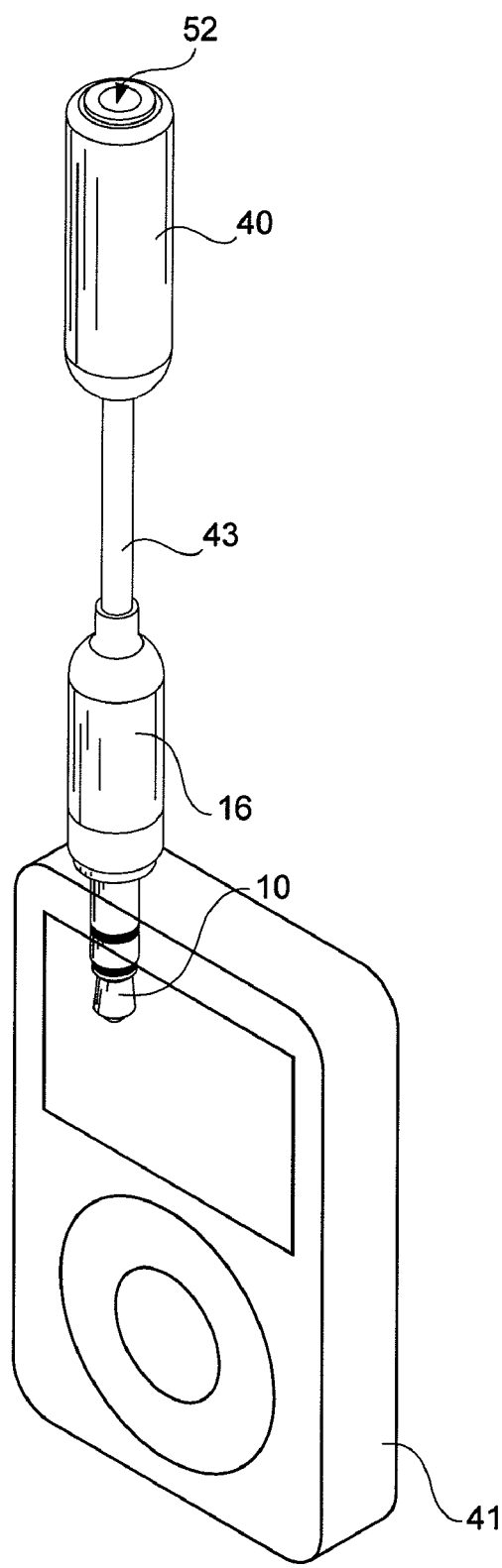
FIG. 10 is a perspective view of the plug and coupler of the connector system of FIG. 1 as used with an IPOD player.

Referring again to FIG. 1, and also referring to FIG. 10, in one preferred embodiment of the present invention, the receptacle 40 for receiving a plug from a device, such as an audio plug from a headset, a virtual-reality goggle or some other device, is displaced on the other end of the coupler 16. Further, in other embodiments the receptacle 40 may be a receptacle for data, power or video plugs, depending on the application. As discussed herein, the flexible extension 43 is displaced between the receptacle 40 and the connector 16.

Figure 11:
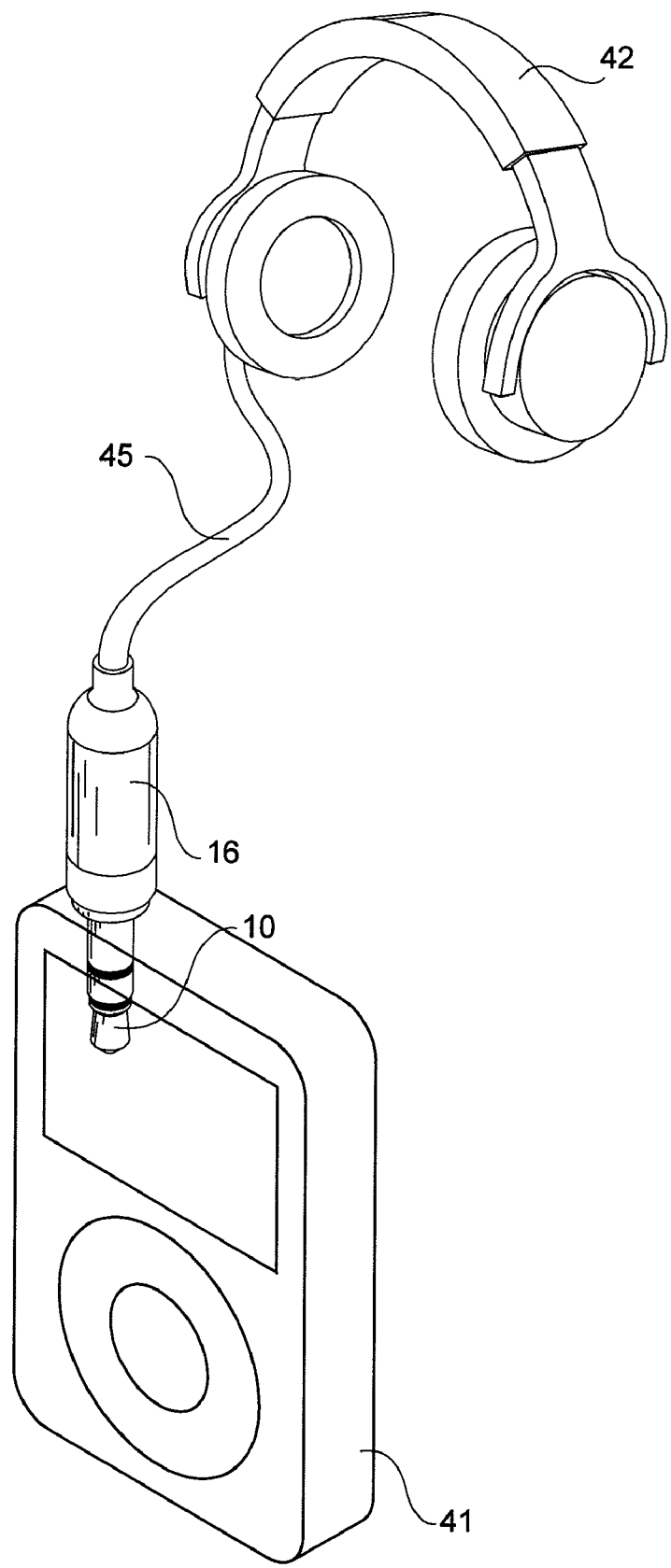
FIG. 11 is a perspective view of the exemplary plug and coupler of the connector system of FIG. 1, as integrated with a headset.

The length of the flexible extension 43 is preferably kept nominal. In some applications, the flexible extension 43 may be entirely avoided, where the receptacle 40 is integrally formed with the other end of the coupler 16 as a one-piece unit, as shown in FIG. 11.

It should be noted that in other preferred embodiments of the present invention, the plurality of electric contacts 15, as displaced on section 14 of the audio plug 10, may be instead displaced on the coupler 16, while the plurality of spring-loaded contacts 22, as displaced on the coupler 16, may be implemented on the audio plug 10. Further, the protruding edge 13 of section 14 of the audio jack 10 may be implemented on the coupler 16 instead, while the resilient cap may be implemented on the audio plug 10. In fact, the displacement of the plurality of contacts/spring-loaded contacts, and the protruding edge/cap could each be differently configured based on different design considerations. It is noted that, in one preferred embodiment of the present invention, the length of audio plug 10 that protrudes above the jack into which it is inserted is kept as short as possible, so as to reduce the leverage effects when a lateral force is experienced by the audio plug 10 and/or the coupler 16.

Additionally, instead of using the plurality of electric contacts 15 and the complementary plurality of spring-loaded contacts 22, various other contacting methods could be utilized. For example, in lieu of a planar and concentrically circular configuration, the plurality of electrical contacts 15 may be of hemi-spherical, spherical or curved shapes, with the plurality of spring-loaded contacts 22 being modified to match the modified shape of the plurality of electrical contacts 15. Those of ordinary skill in the art should be able to devise suitable electric contacts for a conductive path that is engaged by a releasable fit between the parts.

Referring to FIG. 10, an exemplary deployment of the connector system 100 in accordance with one preferred embodiment of the present invention is shown. The audio plug 10 is inserted into an audio jack of an exemplary IPOD player 41. It should be noted that the figure is not to scale and the connector system 100 may be sized differently in relation to the IPOD player 41. The coupler 16 firmly, yet releasably, engages the audio plug 10 by its resilient cap 26 clamping onto the protruding edge 13 of the audio plug 10. A headphone audio plug on a conventional headset (not shown) can be inserted into the opening 52 in receptacle 40 at the other end of the coupler 16. Whenever a lateral force exceeding a preset tolerance is applied to the audio plug 10 or the coupler 16, the cap 26 readily separates from the audio plug 10 so as to avoid damaging the internal connection circuitry of the audio player 41. To resume the user's listening activity, the user can simply re-attach the cap 26 of the coupler 16 to the audio plug 10.

As shown in FIG. 11, the receptacle 40 may be entirely eliminated by integrating a cord 45 of the headset 42 directly onto the coupler 16. In this embodiment, the cord 45 of the headset 42 would be terminated with the plurality of spring-loaded contacts 22 of the break-away coupler 16 and the audio plug 10 of the present invention. Thus, the conventional jack normally used on the headset 42, as well as the receptacle 40, could be entirely eliminated.

Figure 6:
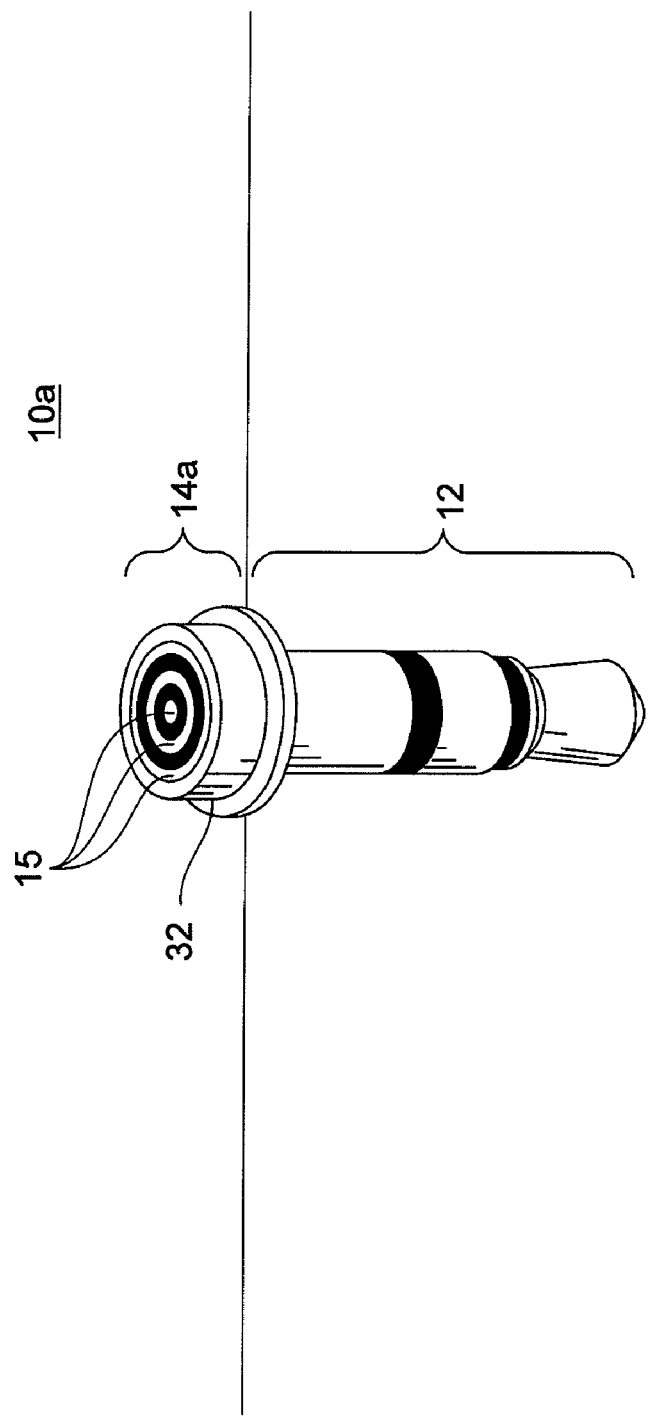
FIG. 6 is a perspective view of a magnetic plug portion of the connector system of FIG. 1 configured in accordance with one preferred embodiment of the present invention.
Figure 7:
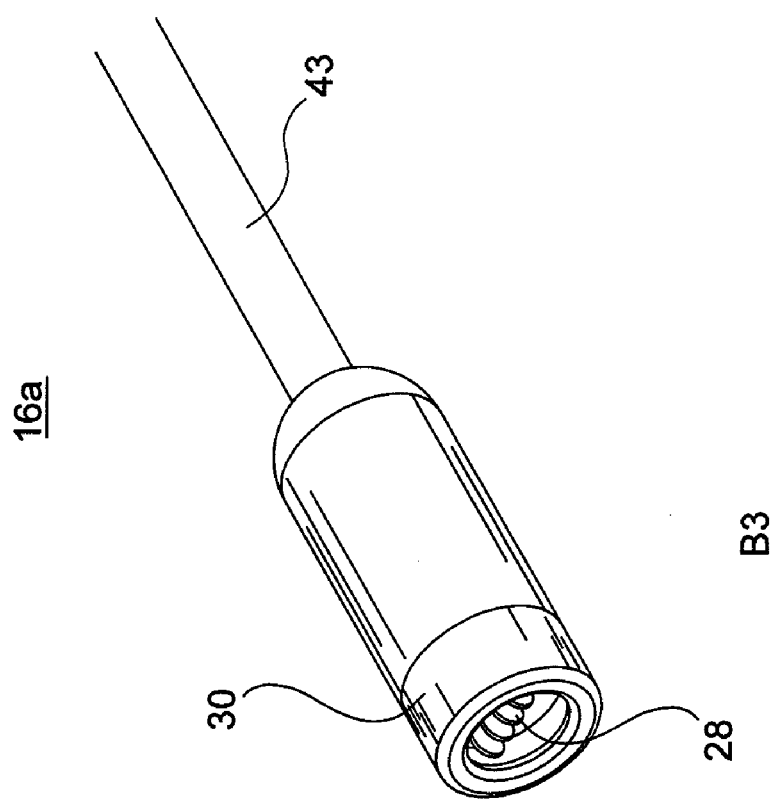
FIG. 7 is a perspective view of a magnetic coupler portion of the connector system of FIG. 1 configured in accordance with one preferred embodiment of the present invention.

FIG. 6 illustrates an audio plug 10a configured in accordance to another preferred embodiment of the present invention and FIG. 7 illustrates a coupler 16a configured to attach to the audio plug 10a. Referring to both figures, another embodiment of attaching the coupler to the audio plug is now described. In this embodiment, instead of using a resilient material for engaging the cable to the audio plug 10a, a firm engagement is achieved by using a cap 30 on the coupler 16a. As shown in FIG. 6, the audio plug 10a is similar to the audio plug 10 as it also has a plurality of electric contacts 15 on the top section 14a of the audio plug 10a. Audio plug 10a does not include a protruding edge at its perimeter to engage to the coupler 16a. Instead, in one preferred embodiment of the present invention, the audio plug 10a includes a band 32 surrounding its side to attach to the coupler 16a. Also, the coupler 16a has a cap 30 enclosing a plurality of spring-loaded contacts 28.

In one preferred embodiment of the present invention, the cap 30 includes a magnet so that it can be releasably attached to the band 32 of the section 14a of the audio plug 10a magnetically. It should be noted that, in another embodiment, the cap 30 can be a metal part, while the band 32 includes a magnet. Or, in yet another embodiment, both the cap 30 and the band 32 could include magnets, but with opposing magnetic polarities. The band 32 is added for the magnetic version of the connector when the other parts of the audio plug 10a is made from chrome or gold-plated brass as neither of these are magnetic. In general, to create a magnetic coupling, the cap 30 and the band 32 both need to include materials that are magnetically compatible in nature.

FIG. 8 illustrate the resilient embodiment of the connector system 100 in a cross-sectional view, where the plurality of electric contacts 22 is biased by a spring 38 in the coupler 16 and surrounded by the cap 26, which acts to clamp the audio plug 10. The audio plug 10 has the protruding edge 13 surrounding the planar contact 14 for being clamped by the cap 26. The spring 38 is shown displaced directly behind the plurality of contacts 22. As described herein, instead of a spring, the plurality of electrical contacts 22 may be biased with other mechanisms or simply be biased through the material properties of the contacts.

FIG. 9 illustrates the cap 30 surrounding the plurality of electric contacts 28, biased by a spring 39, where the cap 30 is made of a magnetic material for attachment to the band 32 of the audio plug 10a. The strength of the magnetic forces can be readily determined based on the specific design requirements and suitable magnetic elements may be used.

While the above description is made with reference made to an audio plug connector, it should be apparent to those skilled in the art that the invention can be readily applied to other interface connectors, such as Universal Serial Bus (USB), Institute of Electrical and Electronic Engineers (IEEE) 1395 (also known as "Firewire"), various video (e.g. RCA), audio (e.g., 6.3 mm audio, 3.5 mm audio, and/or 2.5 mm audio), and/or power connectors.

Figure 12:
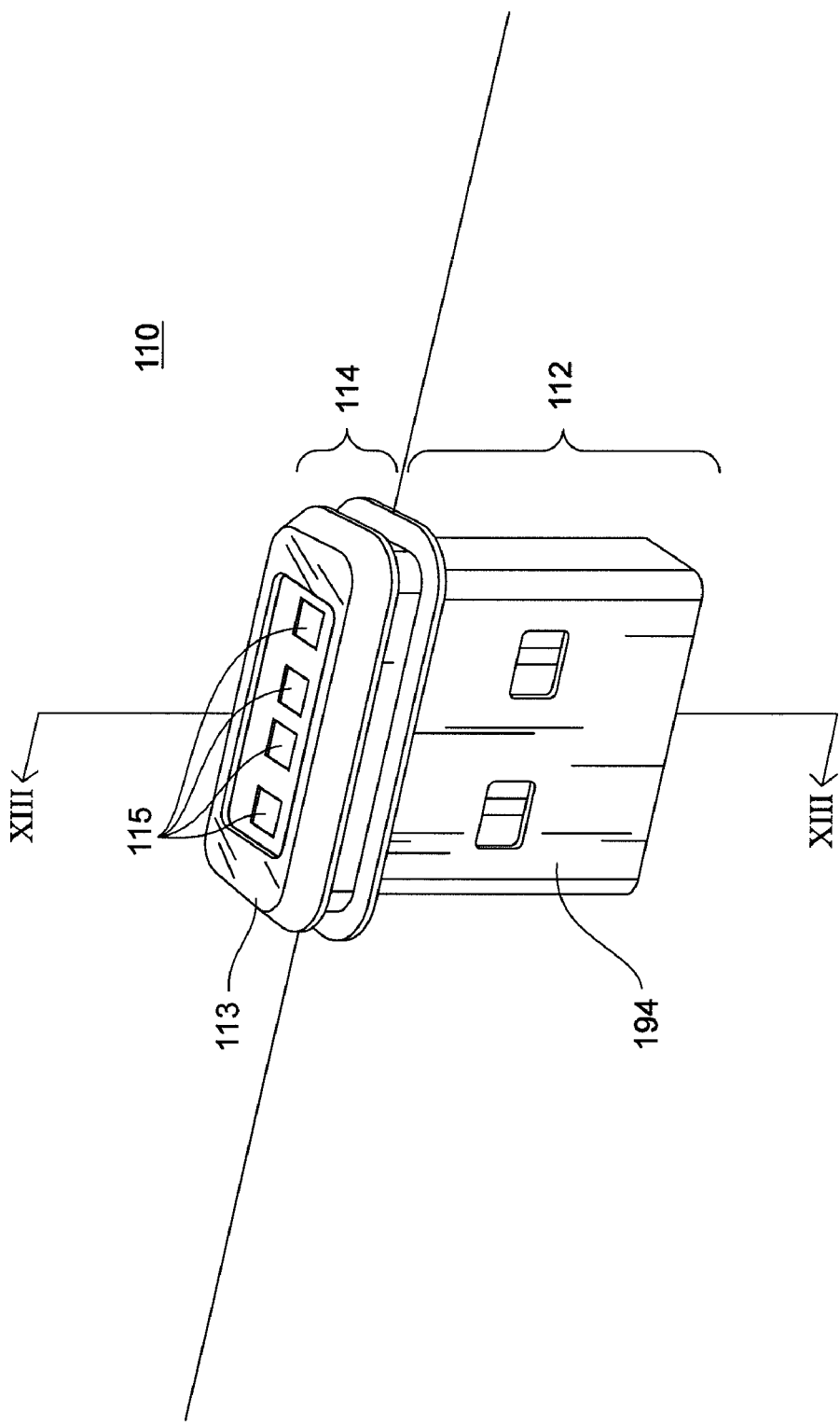
FIG. 12 is a perspective view of a plug portion for a USB connector system configured in accordance with one preferred embodiment of the present invention.

FIG. 12 illustrates a data plug 110 configured in accordance with one preferred embodiment of the present invention for connection with a USB port. The data plug 110 includes two sections 112 and 114. Section 112 represents the portion of the data plug 110 that is to be inserted into the USB port, while section 114 represents the portion of the data plug 110 that remains on the outside of the USB port after the data plug 110 has been inserted. Section 114 preferably has a plurality of electric contacts 115 for connection with a plurality of complementary contacts on a suitably configured coupler (not shown) for a USB cord, similar to the audio coupler disclosed herein. Data plug 110 includes a protruding edge 113 having a function similar to the protruding edge 13 of the audio plug 10.

Figure 14:
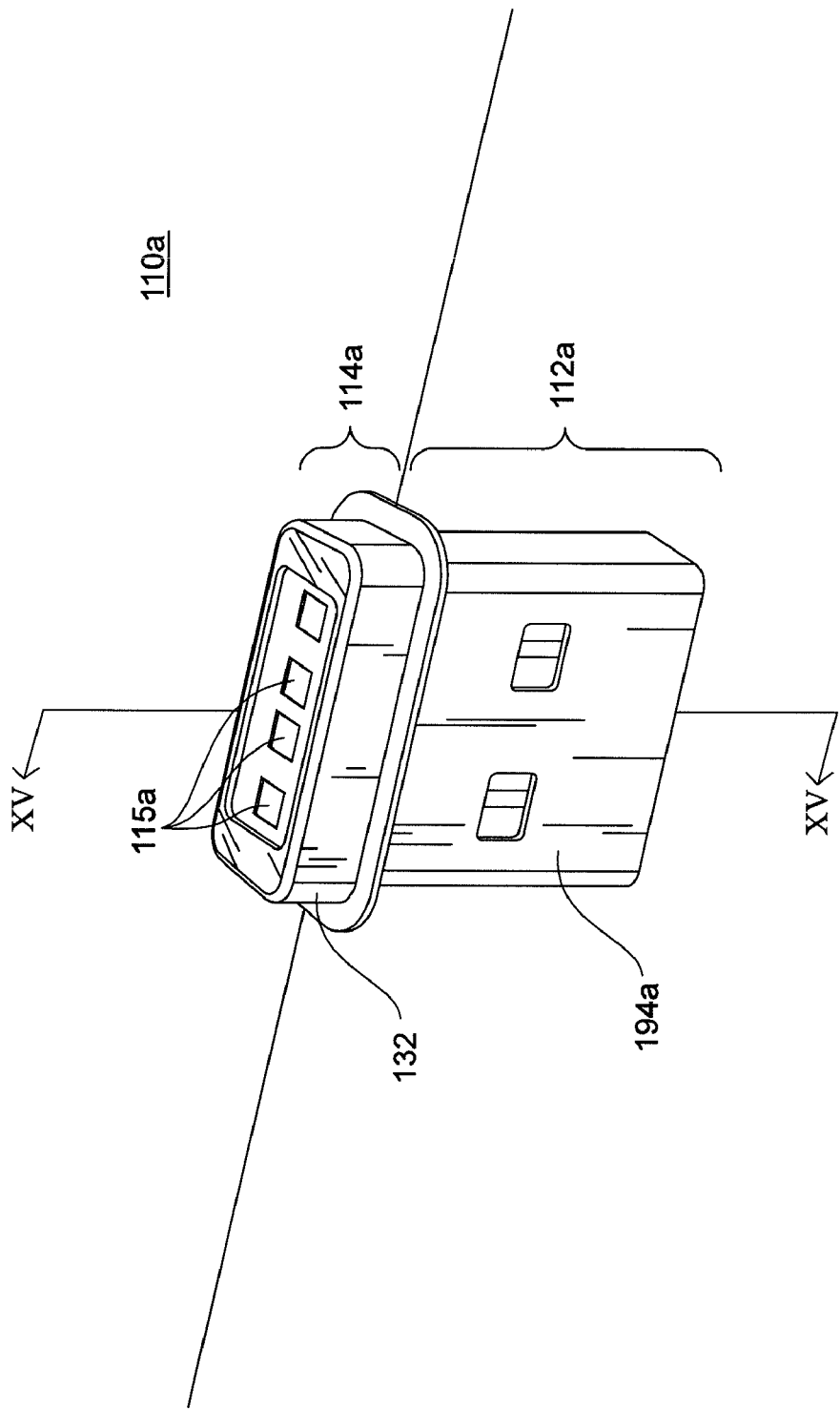
FIG. 14 is a perspective view of a plug portion for a USB connector system configured in accordance with another preferred embodiment of the present invention.

FIG. 14 illustrates a data plug 110a configured in accordance with a second preferred embodiment of the present invention for connection with a USB port. The data plug 110a includes two sections 112a and 114a. Section 112a represents the portion of the data plug 110a that is to be inserted into the USB port, while section 114a represents the portion of the data plug 110a that remains on the outside of the USB port after the data plug 110a has been inserted. In one preferred embodiment of the present invention, section 114a is constructed to magnetically couple to a suitably configured coupler (not shown) for a USB cord, similar to the audio coupler disclosed herein for the audio plug 10a. In this preferred embodiment, section 114a of the data plug 110a includes a band 132 surrounding a housing 194a of the data plug 110a. In another preferred embodiment of the present invention, the band 132 can also formed as part of the housing 194a of the USB plug. Similar to the band 32 used for the audio plug 10a, the band 132 may be made of steel, magnet or any material that is magnetic in nature. In general, to create a magnetic coupling between the band 132 and the cap on the coupler of the USB cable, the band 132 and the cap both need to include materials that are magnetically compatible in nature. Further, section 114a preferably has a plurality of electric contacts 115a for connection with a plurality of complementary contacts on the coupler for the USB cord.

Figure 13:
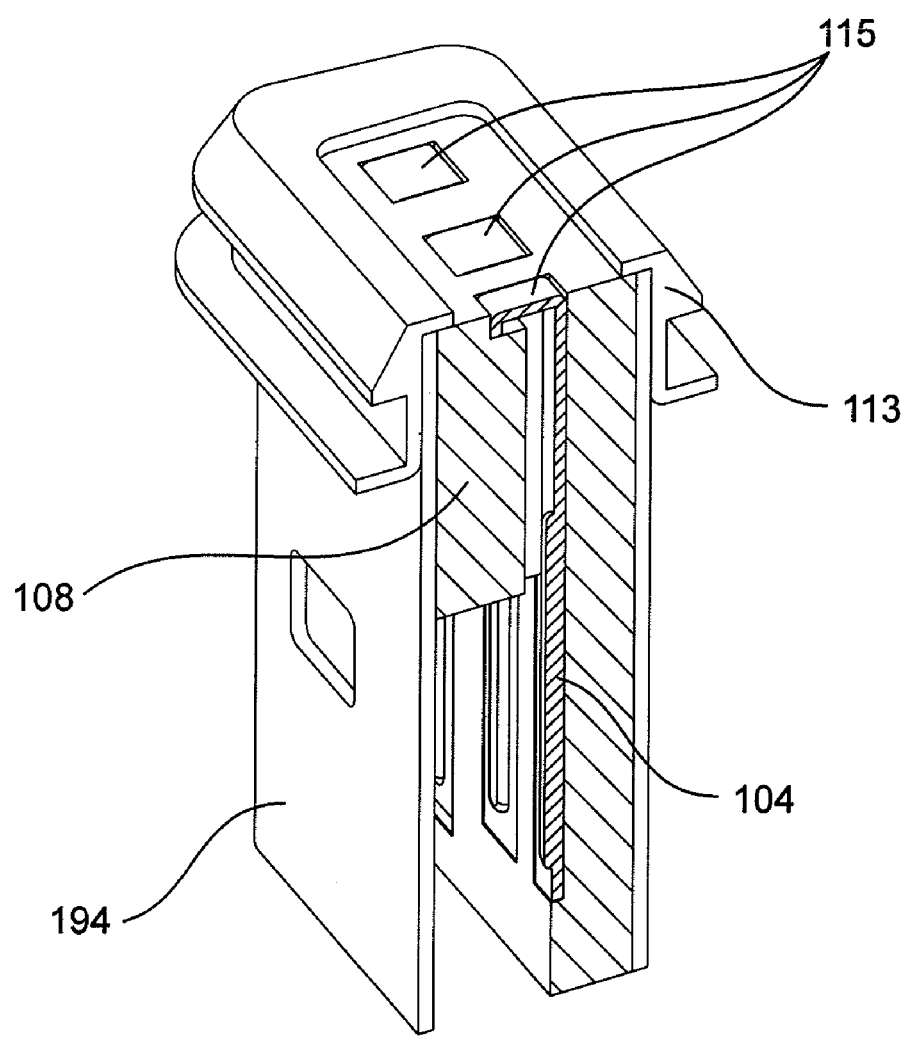
FIG. 13 is a cross-sectional view of the plug portion for the USB connector system of FIG. 12, taken along line XII-XII of FIG. 12.
Figure 15:
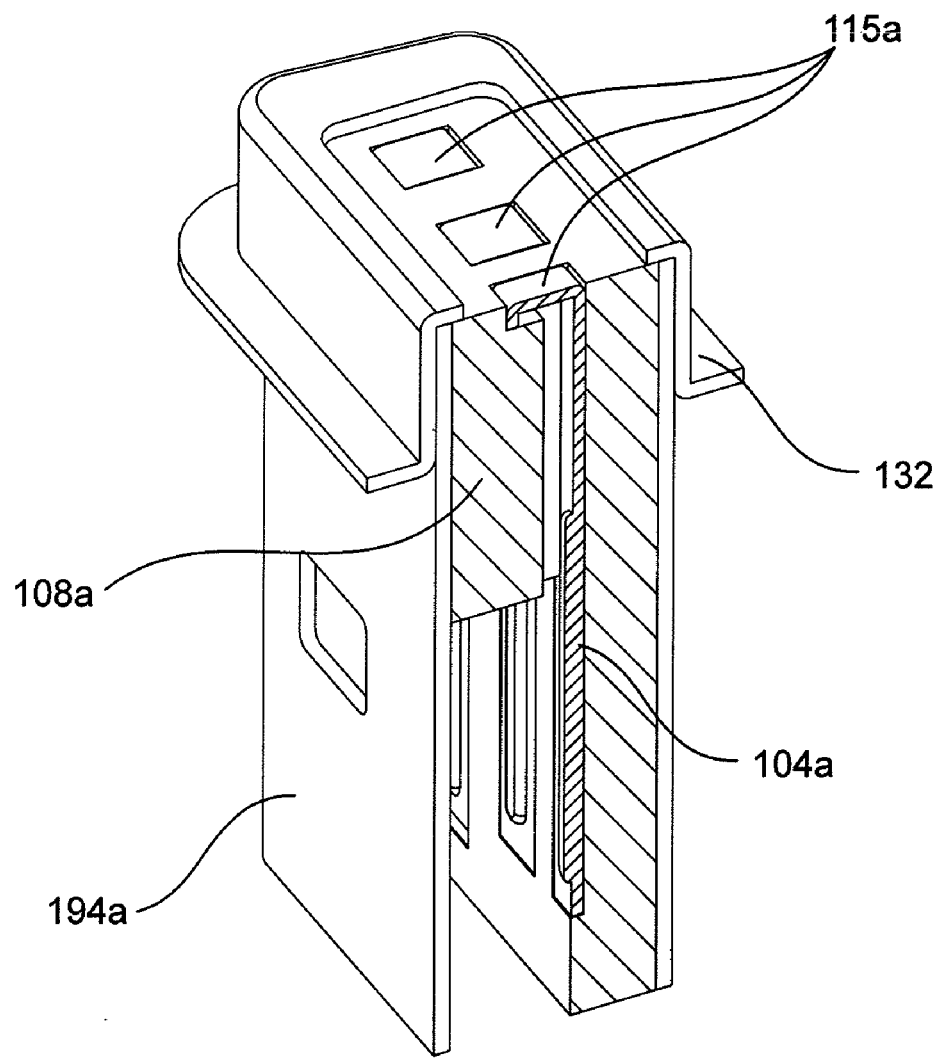
FIG. 15 is a cross-sectional view of the plug portion for the USB connector system of FIG. 14, taken along line XIV-XIV of FIG. 14.
Figure 16:
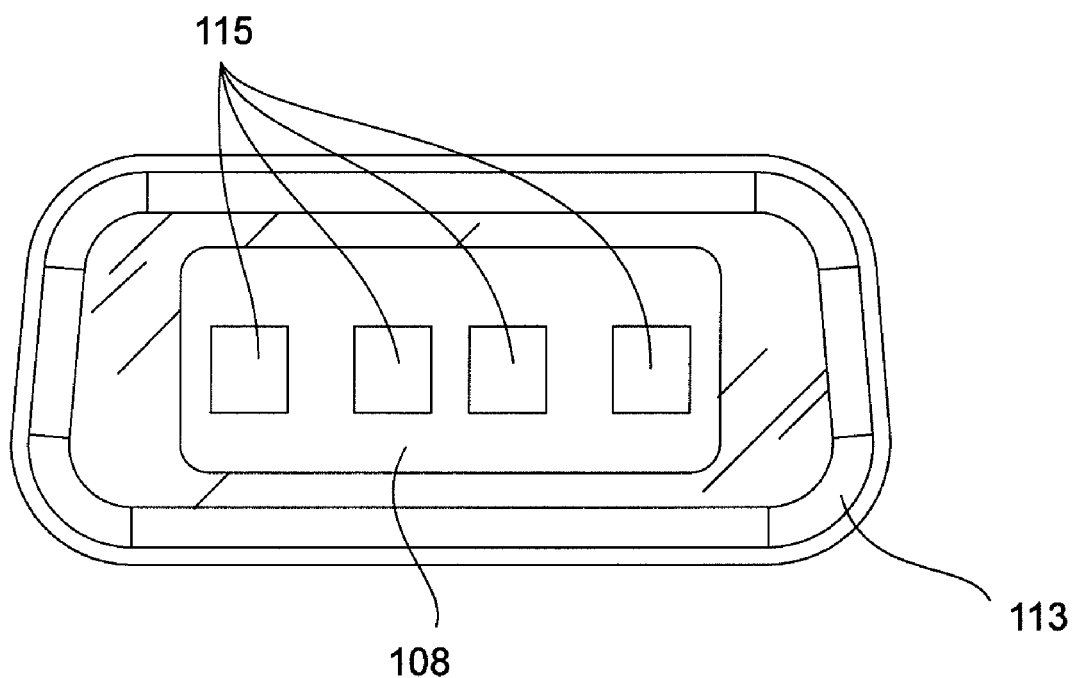
FIG. 16 is a front plan view of the plug portion for the USB connector system of FIG. 12.

FIGS. 13 and 15 illustrate perspective cross-sectional views of the data plugs shown in 12 and 14, respectively, with the data plug 110 illustrated in FIG. 13 configured to couple to a snap adapter, and the data plug 10a illustrated in FIG. 15 configured to couple to a magnet adapter. As illustrated in these figures, each embodiment of the data plug has the plurality of electric contacts 115 (or 115a) extending into a plurality of USB contacts 104 (or 104a) that are integrated into a connector body 108 (or 108a) with a shielding 194 (or 194a) displaced around the connector body 108 (108a). In one preferred embodiment of the present invention, as illustrated in FIG. 16, the profile of the data plug 110 is configured to have a keying feature such as the exemplary trapezoidal shape to prevent users from inserting the data plug 110 into the coupler the wrong way. Since the contacts are arranged linearly, inserting the data plug 110 into the coupler the wrong way could cause problems. In other embodiments, other approaches such as different keying features and/or different contact/connector layouts can be used to minimize the problem of the user inserting the data plug 110 into the coupler the wrong way.

In the cross-sectional views of FIGS. 13 and 15, in one preferred embodiment of the present invention, the ends of the plurality of USB contacts 104 (or 104a) are formed into flat areas as the plurality of electric contacts 115 (or 115a) to be engaged by a plurality of complementary contacts (not shown) in the coupler. As described herein, the plurality of complementary contacts may be spring-loaded. In one preferred embodiment of the present invention, the plurality of USB contacts 104 (or 104a) are in the shape of pins that are inserted into the connector body 108 (or 108a), rather than having plastic being molded around the plurality of USB contacts 104 (or 104a). Features can be added to prevent the plurality of USB contacts 104 (or 104a) from falling out. In one preferred embodiment of the present invention, a flange (e.g., the protruding edge 113 or the band 132, respectively) is displaced around the metal shield (e.g., the housing 194 or 194a, respectively) to trap the plastic housing (e.g., the connector body 108 or 108a, respectively). The USB standard also requires the shield to be wired, so the flange area next to the first and last contact is broad enough to act as a conduction path for the spring contacts. Further, the plurality of USB contacts 104 (or 104a) themselves are used to create the plurality of electric contacts 115 (or 115a) as the contacts to connect to the plurality of complementary contacts on the coupler and thus no extra parts need to be assembled to form these contacts, thereby minimizing the overall size of the connector and reducing manufacturing cost.

In one preferred embodiment of the present invention, slight variations from how most data connectors are made that may be accommodated to implement the invention. For example, connectors conforming to the Deutsches Insitut für Normung eV (DIN), the standards-setting organization for Germany, use cylindrical pins. Rather than bending the pins like in the USB plug, cylindrical pins may be machined flat to form contact surfaces.

Figure 17:
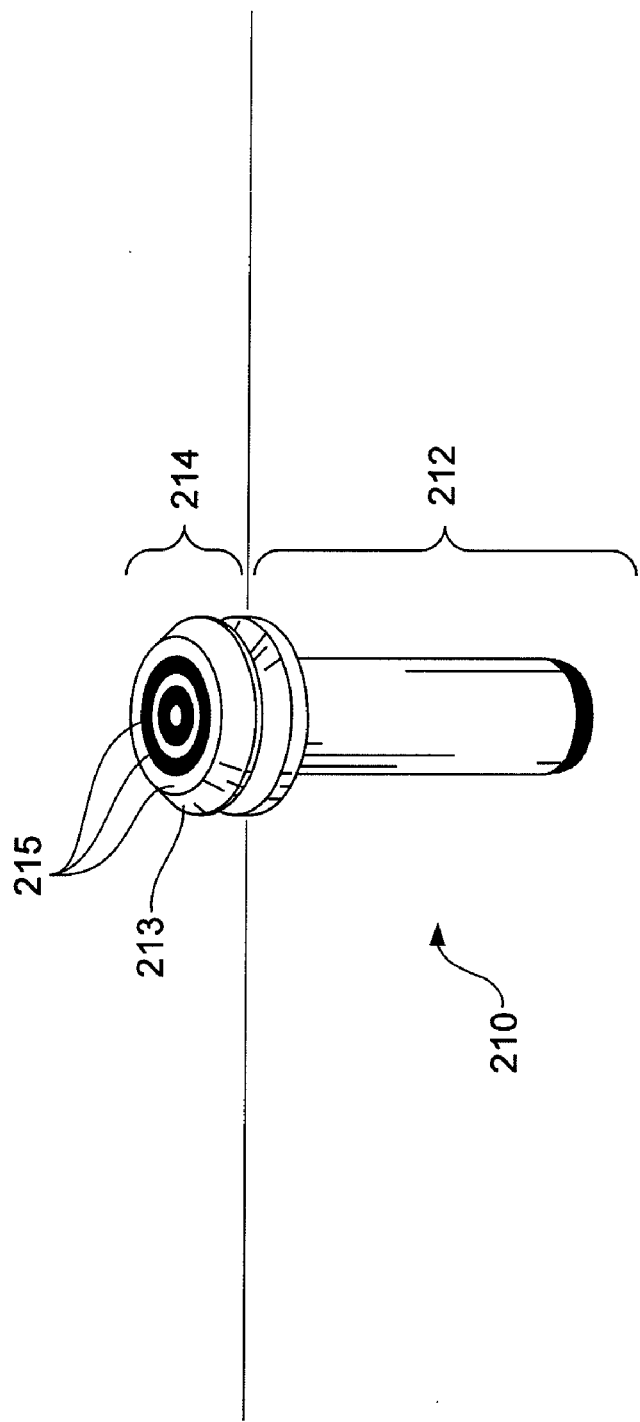
FIG. 17 is a perspective view of a plug portion for a power connector system configured in accordance with one preferred embodiment of the present invention.

FIG. 17 illustrates a power plug 210 configured in accordance with one preferred embodiment of the present invention for connection with a power port. The plug 210 includes two sections 212 and 214. Section 212 represents the portion of the power plug 210 that is to be inserted into the power port, while section 214 represents the portion of the power plug 210 that remains on the outside of the USB port once the power plug 210 has been inserted into the power port. Section 214 preferably has a plurality of electric contacts 215 for connection with a plurality of spring-loaded contacts on a suitably configured coupler (not shown) for a power plug, similar to the audio coupler disclosed herein.

It should be noted that for connectors like audio plugs and some power plugs, the contacts are concentric because the plugs are cylindrical. However, for data connectors like USB or Firewire that are rectangular, the contacts may follow a linear arrangement. One similarity between all these connectors is that the pins/barrels will be the contact surface for the adapter to attach to, without the need to add in secondary parts. Further, for data connectors such as USB or Firewire, a metal element such as steel for attracting a magnet does not have to be added because the connectors typically already have shields made of steel.

The embodiments described above are exemplary embodiments. Those skilled in the art may now make numerous uses of, and departures from, the above-described embodiments without departing from the inventive concepts disclosed herein. Various modifications to these embodiments may be readily apparent to those skilled in the art, and the generic principles defined herein may be applied to other embodiments without departing from the spirit or scope of the novel aspects described herein. Thus, the scope of the invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as the most preferred or advantageous over other embodiments. Accordingly, the present invention is to be defined solely by the scope of the following claims.

What is claimed is:

1. A connector system for coupling to an audio jack of an audio player comprising:
    a) an audio plug comprising:
        i) a first portion configured to fit into said audio jack of said audio player, said audio plug including at least one conductor forming a conducting path with said audio jack;
        ii) a second portion configured to remain on said outside of said audio jack of said audio player after said first portion is inserted into said audio jack, said second portion having at least one contact coupled to said at least one conductor; and,
        iii) a protruding edge surrounding said at least one contact; and,
    b) a coupler to said audio plug comprising:
        i) a first end having at least one coupling contact disposed thereon to contact said at least one contact on said audio plug, and a cap surrounding said at least one coupling contact, said cap configured to releasably engage said protruding edge on said audio plug; and,
        ii) a receptacle at a second end of said coupler for receiving a standard audio plug.

2. The connector system of claim 1, further comprising a cable coupled to said at least one coupling contact and to said receptacle.

3. The connector system of claim 1, wherein said at least one contact comprises a plurality of planar contacts.

4. The connector system of claim 1, wherein said at least one contact comprises a plurality of contacts arranged in concentric circles.

5. The connector system of claim 1, wherein said at least one coupling contact is biased against said at least one contact with a spring.

6. The connector system of claim 1, wherein said second portion has a larger diameter than said first portion.

7. The connector system of claim 1, wherein said cap has a plurality of notches formed thereon.

8. The connector system of claim 1, wherein said protruding edge and said cap are magnetically coupled.

9. The connector system of claim 1, wherein said protruding edge comprises a magnetic material.

10. The connector system of claim 1, wherein said cap comprises a magnetic material.

11. The connector system of claim 8, wherein said cap is configured to be releasably engaged magnetically to said protruding edge until a force of a predetermined amount is applied to at least one of said cap and said protruding edge.

12. A releasable connector system for a media player, said media player having an existing jack for outputting multimedia signals, comprising:
    a) a plug, said plug being configured to fit into said existing jack and provide at least one conducting path from said media player;
    b) a receptacle coupled to said releasable coupler, said receptacle being disposed to receive a standard plug to provide a second conducting path from said standard plug; and,
    c) a releasable coupler having a first portion engaged to said plug and a second portion coupled to said receptacle;
    wherein said releasable coupler is configured to separate into said first portion and said second portion upon experiencing a predetermined external force from one of said plug and said receptacle.

13. The releasable connector system of claim 12, wherein said first portion and said second portion of said releasable coupler comprises a plurality of planar contacts and a plurality of biased contacts, and wherein said plurality of planar contacts and said plurality of biased contacts electrically couple said at least one conducting path and said second conducting path.

14. The releasable connector system of claim 13, wherein the plurality of planar contacts comprises a plurality of contacts arranged in concentric circles.

15. The releasable connector system of claim 13, wherein said engagement of said first portion and said second portion of the releasable coupler is accomplished by one of a clamping force and a magnetic force.

16. The releasable connector system of claim 12, further comprising a cable coupled between said second portion of said releasable coupler and to the receptacle.

17. The releasable connector system of claim 13, wherein at least one of said plurality of biased contacts is biased against at least one of said plurality of planer contacts with a spring.

18. The releasable connector system of claim 13, wherein said second portion has a larger diameter than said first portion.

19. The releasable connector system of claim 12, wherein said releasable coupler comprises a plurality of notches formed thereon.

20. The connector system of claim 12, wherein said first portion comprises a magnetic material.

21. The connector system of claim 12, wherein said second portion comprises a magnetic material.

22. A headset for an audio player, said audio player having an audio jack comprising:

a) an audio plug, comprising:
  i) an inside portion configured to fit into said audio jack of said audio player and providing a conducting path to said audio jack; and
  ii) an outside portion configured to remain on the outside of said player after said inside portion is inserted into said audio jack of said audio player, said outside portion comprising a planar contact coupled to said conducting path; and b) a break-away coupler, comprising:
  i) at least one contact disposed at a first end of said break-away coupler, to contact said planar contact to extend said conducting path;
  ii) a cap surrounding said at least one contact, disposed to releasably engage said audio plug; and
  iii) a headset disposed at a second end of said break-away coupler, wherein said at least one contact disposed at said first end of said break-away coupler extending said conducting path to said headset.

* * * * *